United States Patent
Wang et al.

(10) Patent No.: US 11,062,350 B2
(45) Date of Patent: Jul. 13, 2021

(54) METHOD, APPARATUS, AND DEVICE FOR MONITORING PROMOTION STATUS DATA, AND NON-VOLATILE COMPUTER STORAGE MEDIUM

(71) Applicant: Baidu Online Network Technology (Beijing) Co., Ltd., Beijing (CN)

(72) Inventors: Gongzheng Wang, Beijing (CN); Feng Kuang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 553 days.

(21) Appl. No.: 15/104,950

(22) PCT Filed: Nov. 11, 2015

(86) PCT No.: PCT/CN2015/094275
§ 371 (c)(1),
(2) Date: Jun. 15, 2016

(87) PCT Pub. No.: WO2016/119506
PCT Pub. Date: Aug. 4, 2016

(65) Prior Publication Data
US 2016/0364749 A1 Dec. 15, 2016

(30) Foreign Application Priority Data
Jan. 30, 2015 (CN) .......................... 201510051414.1

(51) Int. Cl.
*G06Q 30/02* (2012.01)
(52) U.S. Cl.
CPC ................. *G06Q 30/0246* (2013.01)
(58) Field of Classification Search
None
See application file for complete search history.

(56) References Cited

U.S. PATENT DOCUMENTS

2006/0173744 A1* 8/2006 Kandasamy ....... G06Q 30/0275
705/14.42
2007/0100803 A1* 5/2007 Cava .................... G06F 16/951
(Continued)

FOREIGN PATENT DOCUMENTS

CN 102279963 A 12/2011
CN 103440320 12/2013
(Continued)

OTHER PUBLICATIONS

International Search Report and Written Opinion of PCT/CN2015/094275 dated Feb. 16, 2016, 8 pp.

*Primary Examiner* — John Van Bramer
(74) *Attorney, Agent, or Firm* — Lathrop GPM LLP

(57) ABSTRACT

The present invention provides a method, apparatus, and device for monitoring promotion status data, and a non-volatile computer storage medium. In the embodiments of the present invention, promotion status data of at least two promotion layers of a promotion account within a specified time range is sampled; then, it is determined, according to the promotion status data of the at least two promotion layers, whether promotion status data of a first promotion layer is consistent with promotion status data of a second promotion layer; if the promotion status data of the first promotion layer is not consistent with the promotion status data of the second promotion layer, an abnormal monitoring result of the promotion account can be obtained. Since it is detected in the multiple promotion layers of the promotion account that the promotion status data of the first promotion layer is not consistent with the promotion status data of the second promotion layer, and the abnormal monitoring result of the promotion account is obtained, relevant personnel may perform a corresponding maintenance operation in time according to the abnormal monitoring result, thereby (Continued)

improving the reliability of evaluation of the promotion effect according to the promotion status data.

15 Claims, 1 Drawing Sheet

(56) References Cited

U.S. PATENT DOCUMENTS

| | | |
|---|---|---|
| 2008/0126159 A1 | 5/2008 | Wee et al. |
| 2009/0222348 A1 | 9/2009 | Ransom et al. |
| 2016/0065604 A1* | 3/2016 | Chen .................. G06Q 30/0185 726/23 |

FOREIGN PATENT DOCUMENTS

| | | |
|---|---|---|
| CN | 103593465 | 2/2014 |
| CN | 104268222 | 1/2015 |
| CN | 104657437 | 5/2015 |
| JP | 2002-245339 A | 8/2002 |
| JP | 2008-135030 A | 6/2008 |

* cited by examiner

METHOD, APPARATUS, AND DEVICE FOR MONITORING PROMOTION STATUS DATA, AND NON-VOLATILE COMPUTER STORAGE MEDIUM

CROSS-REFERENCE TO RELATED APPLICATIONS

This application is a national-phase application claiming the priority of PCT application No., PCT/CN2015/094275, filed Nov. 11, 2015, which claims priority to Chinese Patent Application No. 201510051414.1, filed on Jan. 30, 2015 and entitled "Method and Apparatus for Monitoring Promotion Status Data". The disclosure of the above applications is incorporated herein by reference in its entirety.

BACKGROUND

Technical Field

The present invention relates to the field of information promotion, and in particular, to a method, apparatus, and device for monitoring promotion status data, and a non-volatile computer storage medium.

Related Art

With the development of communication technologies, more and more functions have been integrated into terminals, and thus more and more corresponding applications (Application, APP) are included in the system function lists of the terminals. Some applications may involve information promotion services, such as advertisement promotion, game promotion or application promotion etc. Taking search-based promotion as an example, the structure of a promotion account for the search-based promotion may be formed by four layers: an account layer, a promotion plan layer, a promotion unit layer, and a keyword/creative-idea layer, and the promotion unit layer may be formed by many-to-many keyword lists and creative-idea lists. Generally, the promotion effect can be evaluated by querying for promotion status data of different layers, for example, a click index etc. Generally, a monitoring method based on service flows can be used to monitor the correctness of each piece of promotion status data of a particular promotion layer.

However, since promotion status data has characteristics of various sources and more procession steps, the reliability of evaluation of the promotion effect may not be ensured by only monitoring the correctness of each piece of promotion status data.

SUMMARY

Multiple aspects of the present invention provide a method, apparatus, and device for monitoring promotion status data, and a non-volatile computer storage medium, so as to improve the reliability of evaluation of the promotion effect.

An aspect of the present invention provides a method for monitoring promotion status data, comprising:

sampling promotion status data of at least two promotion layers of a promotion account within a specified time range;

determining, according to the promotion status data of the at least two promotion layers, whether promotion status data of a first promotion layer is consistent with promotion status data of a second promotion layer; and if the promotion status data of the first promotion layer is not consistent with the promotion status data of the second promotion layer, obtaining an abnormal monitoring result of the promotion account.

Based on the foregoing aspect or any one of the possible implementation manners, an implementation manner is further provided, wherein the promotion layer includes:

an account layer; or
a promotion plan layer; or
a promotion unit layer; or
a keyword/creative-idea layer.

Based on the foregoing aspect or any one of the possible implementation manners, an implementation manner is further provided, wherein the promotion status data includes:

a presentation index; or
a click index; or
a consumption index; or
a conversion index; or
a quality score index.

Based on the foregoing aspect or any one of the possible implementation manners, an implementation manner is further provided, wherein before the step of sampling promotion status data of at least two promotion layers of a promotion account within a specified time range, the method further comprises:

obtaining a specified time range close to a current time according to the current time, a promotion-status-data time delay and a monitoring frequency.

Based on the foregoing aspect or any one of the possible implementation manners, an implementation manner is further provided, wherein the first promotion layer is higher than the second promotion layer; and the step of determining, according to the promotion status data of the at least two promotion layers, whether promotion status data of a first promotion layer is consistent with promotion status data of a second promotion layer comprises:

if a sum of the promotion status data of the first promotion layer is equal to a sum of the promotion status data of the second promotion layer, determining that the promotion status data of the first promotion layer is consistent with the promotion status data of the second promotion layer;

if the sum of the promotion status data of the first promotion layer is smaller than the sum of the promotion status data of the second promotion layer, determining that the promotion status data of the first promotion layer is not consistent with the promotion status data of the second promotion layer; and if the sum of the promotion status data of the first promotion layer is greater than the sum of the promotion status data of the second promotion layer, determining, according to whether the promotion status data of the second promotion layer is complete, whether the promotion status data of the first promotion layer is consistent with the promotion status data of the second promotion layer.

Based on the foregoing aspect or any one of the possible implementation manners, an implementation manner is further provided, wherein the step of determining, according to whether the promotion status data of the second promotion layer is complete, whether the promotion status data of the first promotion layer is consistent with the promotion status data of the second promotion layer comprises:

if the promotion status data of the second promotion layer is incomplete, determining that the promotion status data of the first promotion layer is consistent with the promotion status data of the second promotion layer; and if the promotion status data of the second promotion layer is complete, determining that the promotion status data of the first promotion layer is not consistent with the promotion status data of the second promotion layer.

Based on the foregoing aspect or any one of the possible implementation manners, an implementation manner is further provided, wherein the first promotion layer is higher than the second promotion layer; and the step of determining, according to the promotion status data of the at least two promotion layers, whether promotion status data of a first promotion layer is consistent with promotion status data of a second promotion layer comprises:

if promotion status data of a first promotion node in the first promotion layer is equal to a sum of promotion status data of at least one second promotion node that is in the second promotion layer and that corresponds to the first promotion node, determining that the promotion status data of the first promotion layer is consistent with the promotion status data of the second promotion layer;

if the promotion status data of the first promotion node in the first promotion layer is smaller than the sum of the promotion status data of the at least one second promotion node that is in the second promotion layer and that corresponds to the first promotion node, determining, according to whether the promotion status data of the first promotion node is complete, whether the promotion status data of the first promotion layer is consistent with the promotion status data of the second promotion layer; and if the promotion status data of the first promotion node in the first promotion layer is greater than the sum of the promotion status data of the at least one second promotion node that is in the second promotion layer and that corresponds to the first promotion node, determining, according to whether the promotion status data of the second promotion node is complete, whether the promotion status data of the first promotion layer is consistent with the promotion status data of the second promotion layer.

Based on the foregoing aspect or any one of the possible implementation manners, an implementation manner is further provided, wherein the step of determining, according to whether the promotion status data of the first promotion node is complete, whether the promotion status data of the first promotion layer is consistent with the promotion status data of the second promotion layer comprises:

if the promotion status data of the first promotion node is incomplete, determining that the promotion status data of the first promotion layer is consistent with the promotion status data of the second promotion layer; and if the promotion status data of the first promotion node is complete, determining that the promotion status data of the first promotion layer is not consistent with the promotion status data of the second promotion layer;

or the step of determining, according to whether the promotion status data of the second promotion node is complete, whether the promotion status data of the first promotion layer is consistent with the promotion status data of the second promotion layer comprises:

if the promotion status data of the second promotion node is incomplete, determining that the promotion status data of the first promotion layer is consistent with the promotion status data of the second promotion layer; and if the promotion status data of the second promotion node is complete, determining that the promotion status data of the first promotion layer is not consistent with the promotion status data of the second promotion layer.

Based on the foregoing aspect or any one of the possible implementation manners, an implementation manner is further provided, wherein after the step of sampling promotion status data of at least two promotion layers of a promotion account within a specified time range, the method further comprises:

determining, according to the promotion status data of the at least two promotion layers, whether promotion status data of each of the at least two promotion layers in a specified promotion dimension is consistent; and if the promotion status data of each of the at least two promotion layers in the specified promotion dimension is not consistent, obtaining a suspicious monitoring result of the promotion account.

Based on the foregoing aspect or any one of the possible implementation manners, an implementation manner is further provided, wherein the step of determining, according to the promotion status data of the at least two promotion layers, whether promotion status data of each of the at least two promotion layers in a specified promotion dimension is consistent comprises:

if a sum of promotion status data, in the specified promotion dimension, of promotion nodes in a promotion layer is equal to promotion status data of the promotion nodes in the promotion layer, determining that the promotion status data of the promotion layer in the specified promotion dimension is consistent; and if the sum of promotion status data, in the specified promotion dimension, of the promotion nodes in the promotion layer is not equal to promotion status data of the promotion nodes in the promotion layer, determining that the promotion status data of the promotion layer in the specified promotion dimension is not consistent.

Another aspect of the present invention provides an apparatus for monitoring promotion status data, comprising:

a sampling unit, configured to sample promotion status data of at least two promotion layers of a promotion account within a specified time range;

a determining unit, configured to determine, according to the promotion status data of the at least two promotion layers, whether promotion status data of a first promotion layer is consistent with promotion status data of a second promotion layer; and an obtaining unit, configured to: if the promotion status data of the first promotion layer is not consistent with the promotion status data of the second promotion layer, obtain an abnormal monitoring result of the promotion account.

Based on the foregoing aspect or any one of the possible implementation manners, an implementation manner is further provided, where the promotion layer includes:
an account layer; or
a promotion plan layer; or
a promotion unit layer; or
a keyword/creative-idea layer.

Based on the foregoing aspect or any one of the possible implementation manners, an implementation manner is further provided, wherein the promotion status data includes:
a presentation index; or
a click index; or
a consumption index; or
a conversion index; or
a quality score index.

Based on the foregoing aspect or any one of the possible implementation manners, an implementation manner is further provided, wherein the sampling unit is further configured to:

obtain a specified time range close to a current time according to the current time, a promotion-status-data time delay and a monitoring frequency.

Based on the foregoing aspect or any one of the possible implementation manners, an implementation manner is further provided, wherein the first promotion layer is higher than the second promotion layer; and the determining unit is specifically configured to:

if a sum of the promotion status data of the first promotion layer is equal to a sum of the promotion status data of the second promotion layer, determine that the promotion status data of the first promotion layer is consistent with the promotion status data of the second promotion layer;

if the sum of the promotion status data of the first promotion layer is smaller than the sum of the promotion status data of the second promotion layer, determine that the promotion status data of the first promotion layer is not consistent with the promotion status data of the second promotion layer; and if the sum of the promotion status data of the first promotion layer is greater than the sum of the promotion status data of the second promotion layer, determine, according to whether the promotion status data of the second promotion layer is complete, whether the promotion status data of the first promotion layer is consistent with the promotion status data of the second promotion layer.

Based on the foregoing aspect or any one of the possible implementation manners, an implementation manner is further provided, where the determining unit is specifically configured to:

if the promotion status data of the second promotion layer is incomplete, determine that the promotion status data of the first promotion layer is consistent with the promotion status data of the second promotion layer; and if the promotion status data of the second promotion layer is complete, determine that the promotion status data of the first promotion layer is not consistent with the promotion status data of the second promotion layer.

Based on the foregoing aspect or any one of the possible implementation manners, an implementation manner is further provided, wherein the first promotion layer is higher than the second promotion layer; and the determining unit is specifically configured to:

if promotion status data of a first promotion node in the first promotion layer is equal to a sum of promotion status data of at least one second promotion node that is in the second promotion layer and that corresponds to the first promotion node, determine that the promotion status data of the first promotion layer is consistent with the promotion status data of the second promotion layer;

if the promotion status data of the first promotion node in the first promotion layer is smaller than the sum of the promotion status data of the at least one second promotion node that is in the second promotion layer and that corresponds to the first promotion node, determine, according to whether the promotion status data of the first promotion node is complete, whether the promotion status data of the first promotion layer is consistent with the promotion status data of the second promotion layer; and if the promotion status data of the first promotion node in the first promotion layer is greater than the sum of the promotion status data of the at least one second promotion node that is in the second promotion layer and that corresponds to the first promotion node, determine, according to whether the promotion status data of the second promotion node is complete, whether the promotion status data of the first promotion layer is consistent with the promotion status data of the second promotion layer.

Based on the foregoing aspect or any one of the possible implementation manners, an implementation manner is further provided, where the determining unit is specifically configured to:

if the promotion status data of the first promotion node in the first promotion layer is smaller than the sum of the promotion status data of the at least one second promotion node that is in the second promotion layer and that corresponds to the first promotion node, and the promotion status data of the first promotion node is incomplete, determine that the promotion status data of the first promotion layer is consistent with the promotion status data of the second promotion layer;

if the promotion status data of the first promotion node in the first promotion layer is smaller than the sum of the promotion status data of the at least one second promotion node that is in the second promotion layer and that corresponds to the first promotion node, and the promotion status data of the first promotion node is complete, determine that the promotion status data of the first promotion layer is not consistent with the promotion status data of the second promotion layer;

if the promotion status data of the first promotion node in the first promotion layer is greater than the sum of the promotion status data of the at least one second promotion node that is in the second promotion layer and that corresponds to the first promotion node, and the promotion status data of the second promotion node is incomplete, determine that the promotion status data of the first promotion layer is consistent with the promotion status data of the second promotion layer; and if the promotion status data of the first promotion node in the first promotion layer is greater than the sum of the promotion status data of the at least one second promotion node that is in the second promotion layer and that corresponds to the first promotion node, and the promotion status data of the second promotion node is complete, determine that the promotion status data of the first promotion layer is not consistent with the promotion status data of the second promotion layer.

Based on the foregoing aspect or any one of the possible implementation manners, an implementation manner is further provided, wherein the determining unit is further configured to:

determine, according to the promotion status data of the at least two promotion layers, whether promotion status data of each of the at least two promotion layers in a specified promotion dimension is consistent; and the obtaining unit is further configured to:

if the promotion status data of each of the at least two promotion layers in the specified promotion dimension is not consistent, obtain a suspicious monitoring result of the promotion account.

Based on the foregoing aspect or any one of the possible implementation manners, an implementation manner is further provided, wherein the determining unit is specifically configured to:

if a sum of promotion status data, in the specified promotion dimension, of promotion nodes in a promotion layer is equal to promotion status data of the promotion nodes in the promotion layer, determine that the promotion status data of the promotion layer in the specified promotion dimension is consistent; and if the sum of promotion status data, in the specified promotion dimension, of the promotion nodes in the promotion layer is not equal to promotion status data of the promotion nodes in the promotion layer, determine that the promotion status data of the promotion layer in the specified promotion dimension is not consistent.

Another aspect of the present invention provides a device, comprising:

one or more processors;

a memory;

one or more programs, wherein the one or more programs are stored in the memory, and when the one or more programs are executed by the one or more processors, the following operations are performed:

sampling promotion status data of at least two promotion layers of a promotion account within a specified time range;

determining, according to the promotion status data of the at least two promotion layers, whether promotion status data of a first promotion layer is consistent with promotion status data of a second promotion layer; and if the promotion status data of the first promotion layer is not consistent with the promotion status data of the second promotion layer, obtaining an abnormal monitoring result of the promotion account.

Another aspect of the present invention provides a non-volatile computer storage medium, wherein the non-volatile computer storage medium stores one or more programs, and when the one or more programs are executed by a device, the device performs the following operations:

sampling promotion status data of at least two promotion layers of a promotion account within a specified time range;

determining, according to the promotion status data of the at least two promotion layers, whether promotion status data of a first promotion layer is consistent with promotion status data of a second promotion layer; and if the promotion status data of the first promotion layer is not consistent with the promotion status data of the second promotion layer, obtaining an abnormal monitoring result of the promotion account.

It can be known from the foregoing technical solutions that in the embodiments of the present invention, promotion status data of at least two promotion layers of a promotion account within a specified time range is sampled; then, it is determined, according to the promotion status data of the at least two promotion layers, whether promotion status data of a first promotion layer is consistent with promotion status data of a second promotion layer; if the promotion status data of the first promotion layer is not consistent with the promotion status data of the second promotion layer, an abnormal monitoring result of the promotion account can be obtained. Since it is detected in the multiple promotion layers of the promotion account that the promotion status data of the first promotion layer is not consistent with the promotion status data of the second promotion layer, and the abnormal monitoring result of the promotion account is obtained, relevant personnel may perform a corresponding maintenance operation in time according to the abnormal monitoring result, thereby improving the reliability of evaluation of the promotion effect according to the promotion status data.

In addition, by means of the technical solutions provided by the present invention, the specified time range close to the current time is obtained according to the current time, the promotion-status-data time delay and the monitoring frequency. In this way, real-time sampling and monitoring of promotion status data of various promotion layers may be implemented, thereby effectively improving the timeliness of monitoring of promotion status data.

In addition, by means of the technical solutions provided by the present invention, a problem of the promotion status data may be detected in time, thereby effectively ensuring the reliability of evaluation of the promotion effect, and improving promoters' satisfaction.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Figure 1:
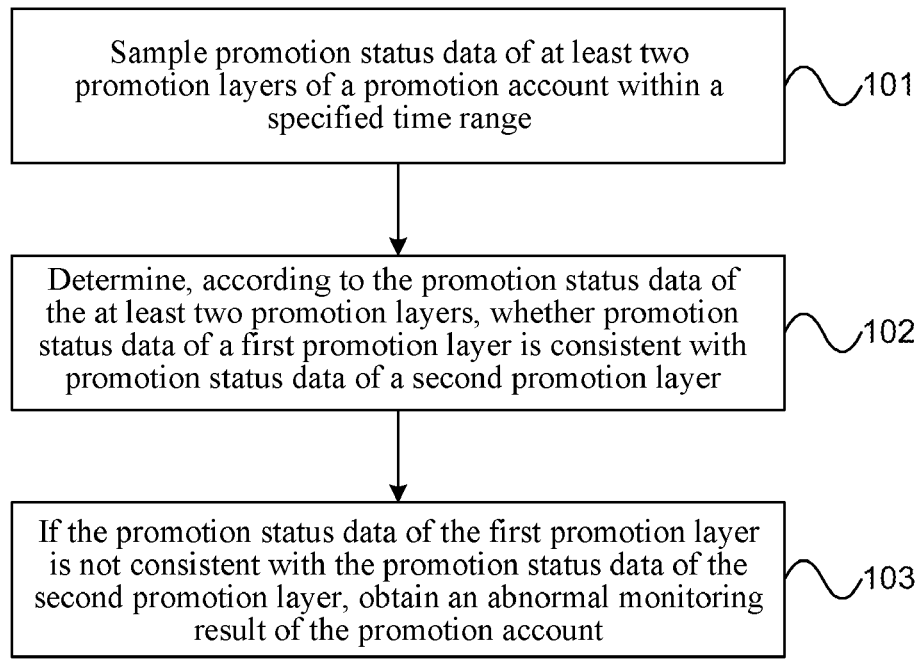
FIG. 1 is a schematic flowchart of a method for monitoring promotion status data according to an embodiment of the present invention.

FIG. 1 is a schematic flowchart of a method for monitoring promotion status data according to an embodiment of the present invention. As shown in FIG. 1,

101: Promotion status data of at least two promotion layers of a promotion account within a specified time range is sampled.

Taking search-based promotion as an example, the structure of a promotion account for the search-based promotion may be formed by four layers: an account layer, a promotion plan layer, a promotion unit layer, and a keyword/creative-idea layer, and the promotion unit layer may be formed by many-to-many keyword lists and creative-idea lists. The so-called search-based promotion refers to the promotion of products or services by means of a search engine such as Baidu or Google.

There is a particular hierarchical structural relationship between the promotion layers. Still taking search-based promotion as an example, the account layer is a promotion layer of the highest level, after which the promotion plan layer, the promotion unit layer, and the keyword/creative-idea layer are sequentially ranked. One piece of promotion information needs to be promoted jointly by different promotion layers; therefore, promotion status data of the promotion layers should be consistent and should reflect the same promotion effect. Otherwise, the promotion effects reflected by the promotion status data of the promotion layers may be inaccurate.

102: It is determined, according to the promotion status data of the at least two promotion layers, whether promotion status data of a first promotion layer is consistent with promotion status data of a second promotion layer.

103: If the promotion status data of the first promotion layer is not consistent with the promotion status data of the second promotion layer, an abnormal monitoring result of the promotion account is obtained.

Then, the abnormal monitoring result of the promotion account may be output, for example, by using an indicator, an SMS message or an email, so that relevant personnel may perform a corresponding maintenance operation in time according to the abnormal monitoring result, thereby improving the reliability of evaluation of the promotion effect according to the promotion status data.

It should be noted that some or all of the steps 101 to 103 may be performed by an application in a local terminal, or by a functional unit such as a plug-in or a software development kit (Software Development Kit, SDK) that is set in an application in the local terminal, or by a processing engine that is located in a network-side server, or by a network-side distributed system, which is not particularly limited in this embodiment.

It may be appreciated that the application may be a native application (nativeApp) installed on the terminal, or may be a web application (webApp) of a browser on the terminal, which is not limited in this embodiment.

In this way, promotion status data of at least two promotion layers of a promotion account within a specified time range is sampled; then, it is determined, according to the promotion status data of the at least two promotion layers, whether promotion status data of a first promotion layer is consistent with promotion status data of a second promotion layer; if the promotion status data of the first promotion layer is not consistent with the promotion status data of the second promotion layer, an abnormal monitoring result of the promotion account may be obtained. Since it is detected in the multiple promotion layers of the promotion account that the promotion status data of the first promotion layer is not consistent with the promotion status data of the second promotion layer, and the abnormal monitoring result of the promotion account is obtained, relevant personnel may perform a corresponding maintenance operation in time according to the abnormal monitoring result, thereby improving the reliability of evaluation of the promotion effect according to the promotion status data.

The promotion status data is an important index that can be used to measure the promotion effect, and may include, but not limited to:
- a presentation index; or
- a click index; or
- a consumption index; or
- a conversion index; or
- a quality score index.

The presentation index may refer to the number of presentations of the promotion information.

The click index may refer to the number of clicks on the promotion information.

The consumption index may refer to promotion costs of the promotion information.

The conversion index may refer to the conversion rate of netizens that click the promotion information and enter the promotion website.

The quality score index may refer to the degree of acceptance of keywords and creative ideas of the promotion information by netizens.

Optionally, in a possible implementation manner of this embodiment, the specified time range based on which the sampling operation in the step 101 is performed may be a historical time range, or may be a real-time time range, which is not particularly limited in this embodiment.

Since the sampled promotion status data is obtained through calculation or query according to source data, and the source data needs to be subjected to a large number of processing steps, such as log output, log cutting, multi-level multi-path transmission, log distribution, log statistics, filtering of invalid clicks, rebate, warehousing, and service-layer filtering and presentation, the promotion status data that may be sampled at the current time has a particular time delay. Therefore, to ensure that valid promotion status data may be sampled, before the step 101, a step of setting the real-time time range needs to be performed.

In a specific implementation process, specifically, a specified time range close to the current time may be obtained according to the current time, a promotion-status-data time delay and a monitoring frequency. The promotion-status-data time delay refers to the difference between the current time and a time at which source data corresponding to the promotion status data that may be sampled at the current time is generated.

For example, the promotion-status-data time delay and a monitoring period may be subtracted from the current time to obtain a first time, that is, the first time=the current time−the promotion-status-data time delay−the monitoring period, wherein the first time is used as the start time of the source data corresponding to the sampled promotion status data, and the monitoring period may be obtained according to the monitoring frequency; the promotion-status-data time delay may be subtracted from the current time to obtain a second time point, that is, the second time=the current time−the promotion-status-data time delay, wherein the second time is used as the end time of the source data corresponding to the sampled promotion status data.

Therefore, the specified time range close to the current time is obtained according to the current time, the promotion-status-data time delay and the monitoring frequency. In this way, real-time sampling and monitoring of promotion status data of various promotion layers may be implemented, thereby effectively improving the timeliness of monitoring of promotion status data.

Optionally, in a possible implementation manner of this embodiment, assuming that the first promotion layer is higher than the second promotion layer, the step 102 may specifically be: determining, according to whether a sum of the promotion status data of the first promotion layer is equal to a sum of the promotion status data of the second promotion layer, whether the promotion status data of the first promotion layer is consistent with the promotion status data of the second promotion layer.

Since each promotion layer may include multiple promotion nodes, the sum of the promotion status data of the promotion layer refers to the sum of promotion status data of all the promotion nodes in the promotion layer. Taking search-based promotion as an example, the account layer may include one promotion node, and the promotion node corresponds to one promotion account; the promotion plan layer may include one or more promotion nodes, each promotion node may correspond to one promotion plan; the promotion unit layer may include one or more promotion nodes, and each promotion node may correspond to one promotion unit; the keyword/creative-idea layer may include one or more promotion nodes, and each promotion node may correspond to one group of keywords and creative ideas. Because of the hierarchical structural relationship between the promotion layers, promotion status data of the promotion layers should be consistent; otherwise, the promotion effects reflected by the promotion status data of the promotion layers may be inaccurate.

It may be appreciated that the technical solution provided by the present invention is applicable to a case in which a same type of promotion status data is sampled from the promotion layers during the monitoring process. If multiple types of promotion status data need to be taken into account, the operations in the steps 101 to 103 may be separately performed for each type of promotion status data.

In a specific implementation process, if the sum of the promotion status data of the first promotion layer is equal to the sum of the promotion status data of the second promotion layer, for example, for one promotion account, the click index of the account layer is equal to the sum of the click indexes of all the promotion plans in the promotion plan layer, it may be determined that the promotion status data of the first promotion layer is consistent with the promotion status data of the second promotion layer.

In another specific implementation process, if the sum of the promotion status data of the first promotion layer is smaller than the sum of the promotion status data of the second promotion layer, for example, for one promotion account, the click index of the account layer is smaller than the sum of the click indexes of all the promotion plans in the promotion plan layer, it may be determined that the promotion status data of the first promotion layer is not consistent with the promotion status data of the second promotion layer.

Since in an actual query process, an inquirer may have some simple query demands, which may lead to that a particular promotion layer needs to include only some of the promotion nodes, and no longer includes all the promotion nodes. For example, one promotion account actually has two promotion plans in the promotion plan layer, but promotion status data of only one of the promotion plans is of interest to the current query. In this case, query data obtained from the promotion plan layer includes only the promotion status data of only one of the promotion plans. Therefore, the promotion status data of the promotion layer is incomplete, and the sum of the promotion status data of the promotion layer is no longer equal to the sum of the promotion status data of the other promotion layers, but is smaller than the sum of the promotion status data of the other promotion layers. That is to say, as long as the sum of the promotion status data of the promotion layer is smaller than the sum of the promotion status data of the other promotion layers, it may be determined that the promotion status data of the promotion layer is consistent with the promotion status data of the other promotion layers.

In another specific implementation process, if the sum of the promotion status data of the first promotion layer is greater than the sum of the promotion status data of the second promotion layer, for example, for one promotion account, the click index of the account layer is greater than the sum of the click indexes of all the promotion plans in the promotion plan layer, it may be determined, according to whether the promotion status data of the second promotion layer is complete, whether the promotion status data of the first promotion layer is consistent with the promotion status data of the second promotion layer.

For example, if the promotion status data of the second promotion layer is incomplete, it may be determined that the promotion status data of the first promotion layer is consistent with the promotion status data of the second promotion layer.

Alternatively, for another example, if the promotion status data of the second promotion layer is complete, it is determined that the promotion status data of the first promotion layer is not consistent with the promotion status data of the second promotion layer.

Optionally, in a possible implementation manner of this embodiment, assuming that the first promotion layer is higher than the second promotion layer, the step 102 may specifically be: determining, according to whether a sum of promotion status data of a first promotion node in the first promotion layer is equal to a sum of promotion status data of at least one second promotion node that is in the second promotion layer and that corresponds to the first promotion node, whether the promotion status data of the first promotion layer is consistent with the promotion status data of the second promotion layer.

In a specific implementation process, if the promotion status data of the first promotion node in the first promotion layer is equal to the sum of the promotion status data of the at least one second promotion node that is in the second promotion layer and that corresponds to the first promotion node, for example, for one promotion account, the click index of a promotion plan in the promotion plan layer is equal to the sum of the click indexes of all promotion units in the promotion unit layer that correspond to the promotion plan, it may be determined that the promotion status data of the first promotion layer is consistent with the promotion status data of the second promotion layer.

Since in an actual query process, an inquirer may have some simple query demands, which may lead to that in a particular dimension, a promotion node in a promotion layer needs to include only a part of the promotion status data, and no longer includes the entire promotion status data. Therefore, the promotion status data of the promotion node is incomplete, and a sum of promotion status data of promotion nodes that are in other promotion layers and that correspond to the promotion node is no longer equal to a sum of the promotion status data of the promotion node and promotion status data of other promotion nodes in the promotion layer that correspond to the promotion node, but is greater than the sum of the promotion status data of the promotion node and the promotion status data of the other promotion nodes in the promotion layer that correspond to the promotion node. That is to say, as long as the sum of the promotion status data of the promotion node and the promotion status data of the other promotion nodes in the promotion layer that correspond to the promotion node is smaller than the sum of the promotion status data of the promotion nodes that are in the other promotion layers and that correspond to the promotion node, it may be determined that the promotion status data of the promotion layer is consistent with the promotion status data of the other promotion layers.

In another specific implementation process, if the promotion status data of the first promotion node in the first promotion layer is smaller than the sum of the promotion status data of the at least one second promotion node that is in the second promotion layer and that corresponds to the first promotion node, for example, for one promotion account, the click index of a promotion plan in the promotion plan layer is smaller than the sum of the click indexes of all promotion units in the promotion unit layer that correspond to the promotion plan, it may be determined, according to whether the promotion status data of the first promotion node is complete, whether the promotion status data of the first promotion layer is consistent with the promotion status data of the second promotion layer.

For example, if the promotion status data of the first promotion node is incomplete, it may be determined that the promotion status data of the first promotion layer is consistent with the promotion status data of the second promotion layer.

Alternatively, for another example, if the promotion status data of the first promotion node is complete, it may be determined that the promotion status data of the first promotion layer is not consistent with the promotion status data of the second promotion layer.

In another specific implementation process, if the promotion status data of the first promotion node in the first promotion layer is greater than the sum of the promotion status data of the at least one second promotion node that is in the second promotion layer and that corresponds to the first promotion node, for example, for one promotion account, the click index of a promotion plan in the promotion plan layer is greater than the sum of the click indexes of all promotion units in the promotion unit layer that correspond to the promotion plan, it may be determined, according to whether the promotion status data of the second promotion node is complete, whether the promotion status data of the first promotion layer is consistent with the promotion status data of the second promotion layer.

For example, if the promotion status data of the second promotion node is incomplete, it may be determined that the promotion status data of the first promotion layer is consistent with the promotion status data of the second promotion layer.

Alternatively, for another example, if the promotion status data of the second promotion node is complete, it may be determined that the promotion status data of the first promotion layer is not consistent with the promotion status data of the second promotion layer.

Generally, different promotion dimensions, for example, a promotion device dimension such as PC or mobile phone, or for another example, a promotion region dimension such as Beijing or Shanghai, may further be defined inside the promotion layer; therefore, the promotion status data of each promotion layer in these promotion dimensions should also be consistent.

Optionally, in a possible implementation manner of this embodiment, after the step 101, it may further be determined, according to the promotion status data of the at least two promotion layers, whether promotion status data of each of the at least two promotion layers in a specified promotion dimension is consistent. If the promotion status data of each of the at least two promotion layers in the specified promotion dimension is not consistent, a suspicious monitoring result of the promotion account may be obtained. Then, the abnormal monitoring result of the promotion account may be output, for example, by using an indicator, an SMS message or an email, so that relevant personnel may perform a corresponding maintenance operation in time according to the abnormal monitoring result, thereby improving the reliability of evaluation of the promotion effect according to the promotion status data.

In a specific implementation process, if a sum of promotion status data, in the specified promotion dimension, of promotion nodes in a promotion layer is equal to promotion status data of the promotion nodes in the promotion layer, it may be determined that the promotion status data of the promotion layer in the specified promotion dimension is consistent.

In another specific implementation process, if the sum of promotion status data, in the specified promotion dimension, of the promotion nodes in the promotion layer is not equal to promotion status data of the promotion nodes in the promotion layer, it may be determined that the promotion status data of the promotion layer in the specified promotion dimension is not consistent.

In this embodiment, promotion status data of at least two promotion layers of a promotion account within a specified time range is sampled; then, it is determined, according to the promotion status data of the at least two promotion layers, whether promotion status data of a first promotion layer is consistent with promotion status data of a second promotion layer; if the promotion status data of the first promotion layer is not consistent with the promotion status data of the second promotion layer, an abnormal monitoring result of the promotion account can be obtained. Since it is detected in the multiple promotion layers of the promotion account that the promotion status data of the first promotion layer is not consistent with the promotion status data of the second promotion layer, and the abnormal monitoring result of the promotion account is obtained, relevant personnel may perform a corresponding maintenance operation in time according to the abnormal monitoring result, thereby improving the reliability of evaluation of the promotion effect according to the promotion status data.

In addition, by means of the technical solution provided by the present invention, the specified time range close to the current time is obtained according to the current time, the promotion-status-data time delay and the monitoring frequency. In this way, real-time sampling and monitoring of promotion status data of various promotion layers may be implemented, thereby effectively improving the timeliness of monitoring of promotion status data.

In addition, by means of the technical solution provided by the present invention, a problem of the promotion status data may be detected in time, thereby effectively ensuring the reliability of evaluation of the promotion effect, and improving promoters' satisfaction.

It should be noted that for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also understand that the embodiments described in this specification all belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

Figure 2:
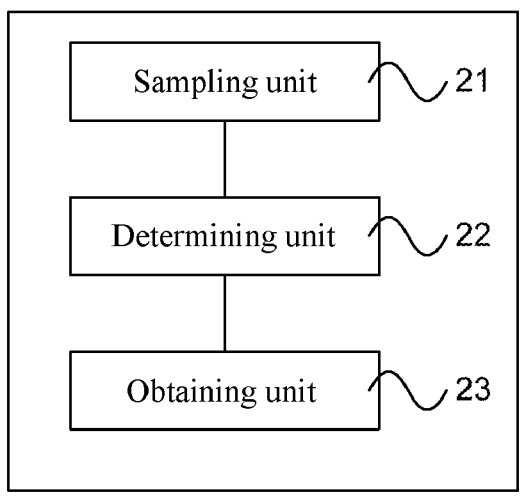
FIG. 2 is a schematic structural diagram of an apparatus for monitoring promotion status data according to another embodiment of the present invention.

FIG. 2 is a schematic structural diagram of an apparatus for monitoring promotion status data according to another embodiment of the present invention. As shown in FIG. 2, the apparatus for monitoring promotion status data of this embodiment may include a sampling unit 21, a determining unit 22, and an obtaining unit 23. The sampling unit 21 is configured to sample promotion status data of at least two promotion layers of a promotion account within a specified time range. The determining unit 22 is configured to determine, according to the promotion status data of the at least two promotion layers, whether promotion status data of a first promotion layer is consistent with promotion status data of a second promotion layer. The obtaining unit 23 is configured to: if the promotion status data of the first promotion layer is not consistent with the promotion status data of the second promotion layer, obtain an abnormal monitoring result of the promotion account.

Taking search-based promotion as an example, the structure of a promotion account for the search-based promotion may be formed by four layers: an account layer, a promotion plan layer, a promotion unit layer, and a keyword/creative-idea layer, and the promotion unit layer may be formed by many-to-many keyword lists and creative-idea lists. The so-called search-based promotion refers to the promotion of products or services by means of a search engine such as Baidu or Google.

It should be noted that a part or the entire of the apparatus for monitoring promotion status data that is provided by this embodiment may be an application in a local terminal, or be a functional unit such as a plug-in or a software development kit (Software Development Kit, SDK) that is set in an application in the local terminal, or be a processing engine that is located in a network-side server, or be a network-side distributed system, which is not particularly limited in this embodiment.

It may be appreciated that the application may be a native application (nativeApp) installed on the terminal, or may be a web application (webApp) of a browser on the terminal, which is not limited in this embodiment.

The promotion status data is an important index that may be used to measure the promotion effect, and may include, but not limited to:
a presentation index; or
a click index; or
a consumption index; or
a conversion index; or
a quality score index.

Optionally, in a possible implementation manner of this embodiment, the sampling unit 21 may be further configured to obtain a specified time range close to a current time according to the current time, a promotion-status-data time delay and a monitoring frequency. Therefore, the specified time range close to the current time is obtained according to the current time, the promotion-status-data time delay and the monitoring frequency. In this way, real-time sampling and monitoring of promotion status data of various promotion layers may be implemented, thereby effectively improving the timeliness of monitoring of promotion status data.

Optionally, in a possible implementation manner of this embodiment, assuming that the first promotion layer is higher than the second promotion layer, the determining unit 22 may be specifically configured to: if a sum of the promotion status data of the first promotion layer is equal to a sum of the promotion status data of the second promotion layer, determine that the promotion status data of the first promotion layer is consistent with the promotion status data of the second promotion layer; if the sum of the promotion status data of the first promotion layer is smaller than the sum of the promotion status data of the second promotion layer, determine that the promotion status data of the first promotion layer is not consistent with the promotion status data of the second promotion layer; and if the sum of the promotion status data of the first promotion layer is greater than the sum of the promotion status data of the second promotion layer, determine, according to whether the promotion status data of the second promotion layer is complete, whether the promotion status data of the first promotion layer is consistent with the promotion status data of the second promotion layer.

In a specific implementation process, the determining unit 22 may be specifically configured to: if the promotion status data of the second promotion layer is incomplete, determine that the promotion status data of the first promotion layer is consistent with the promotion status data of the second promotion layer; and if the promotion status data of the second promotion layer is complete, determine that the promotion status data of the first promotion layer is not consistent with the promotion status data of the second promotion layer.

Optionally, in a possible implementation manner of this embodiment, assuming that the first promotion layer is higher than the second promotion layer, the determining unit 22 may be specifically configured to: if promotion status data of a first promotion node in the first promotion layer is equal to a sum of promotion status data of at least one second promotion node that is in the second promotion layer and that corresponds to the first promotion node, determine that the promotion status data of the first promotion layer is consistent with the promotion status data of the second promotion layer; if the promotion status data of the first promotion node in the first promotion layer is smaller than the sum of the promotion status data of the at least one second promotion node that is in the second promotion layer and that corresponds to the first promotion node, determine, according to whether the promotion status data of the first promotion node is complete, whether the promotion status data of the first promotion layer is consistent with the promotion status data of the second promotion layer; and if the promotion status data of the first promotion node in the first promotion layer is greater than the sum of the promotion status data of the at least one second promotion node that is in the second promotion layer and that corresponds to the first promotion node, determine, according to whether the promotion status data of the second promotion node is complete, whether the promotion status data of the first promotion layer is consistent with the promotion status data of the second promotion layer.

In a specific implementation process, the determining unit 22 may be specifically configured to: if the promotion status data of the first promotion node in the first promotion layer is smaller than the sum of the promotion status data of the at least one second promotion node that is in the second promotion layer and that corresponds to the first promotion node, and the promotion status data of the first promotion node is incomplete, determine that the promotion status data of the first promotion layer is consistent with the promotion status data of the second promotion layer; if the promotion status data of the first promotion node in the first promotion layer is smaller than the sum of the promotion status data of the at least one second promotion node that is in the second promotion layer and that corresponds to the first promotion node, and the promotion status data of the first promotion node is complete, determine that the promotion status data of the first promotion layer is not consistent with the promotion status data of the second promotion layer; if the promotion status data of the first promotion node in the first promotion layer is greater than the sum of the promotion status data of the at least one second promotion node that is in the second promotion layer and that corresponds to the first promotion node, and the promotion status data of the second promotion node is incomplete, determine that the promotion status data of the first promotion layer is consistent with the promotion status data of the second promotion layer; and if the promotion status data of the first promotion node in the first promotion layer is greater than the sum of the promotion status data of the at least one second promotion node that is in the second promotion layer and that corresponds to the first promotion node, and the promotion status data of the second promotion node is complete, determine that the promotion status data of the first promotion layer is not consistent with the promotion status data of the second promotion layer.

Optionally, in a possible implementation manner of this embodiment, the determining unit 22 may be further configured to determine, according to the promotion status data of the at least two promotion layers, whether promotion status data of each of the at least two promotion layers in a specified promotion dimension is consistent; correspondingly, the obtaining unit 23 may be further configured to: if the promotion status data of each of the at least two promotion layers in the specified promotion dimension is not consistent, obtain a suspicious monitoring result of the promotion account.

In a specific implementation process, the determining unit 22 may be specifically configured to: if a sum of promotion status data, in the specified promotion dimension, of promotion nodes in a promotion layer is equal to promotion status data of the promotion nodes in the promotion layer, determine that the promotion status data of the promotion layer in the specified promotion dimension is consistent; and if the sum of promotion status data, in the specified promotion dimension, of the promotion nodes in the promotion layer is not equal to promotion status data of the promotion nodes in the promotion layer, determine that the promotion status data of the promotion layer in the specified promotion dimension is not consistent.

It should be noted that the method in the embodiment corresponding to FIG. 1 may be implemented by the apparatus for monitoring promotion status data that is provided by this embodiment. For the detailed description, reference may be made to the related content in the embodiment corresponding to FIG. 1, and the details are not described herein again.

In this embodiment, the sampling unit samples promotion status data of at least two promotion layers of a promotion account within a specified time range; then, the determining unit determines, according to the promotion status data of the at least two promotion layers, whether promotion status data of a first promotion layer is consistent with promotion status data of a second promotion layer; if the promotion status data of the first promotion layer is not consistent with the promotion status data of the second promotion layer, the obtaining unit may obtain an abnormal monitoring result of the promotion account. Since it is detected in the multiple promotion layers of the promotion account that the promotion status data of the first promotion layer is not consistent with the promotion status data of the second promotion layer, and the abnormal monitoring result of the promotion account is obtained, relevant personnel may perform a corresponding maintenance operation in time according to the abnormal monitoring result, thereby improving the reliability of evaluation of the promotion effect according to the promotion status data.

In addition, by means of the technical solution provided by the present invention, the specified time range close to the current time is obtained according to the current time, the promotion-status-data time delay and the monitoring frequency. In this way, real-time sampling and monitoring of promotion status data of various promotion layers may be implemented, thereby effectively improving the timeliness of monitoring of promotion status data.

In addition, by means of the technical solution provided by the present invention, a problem of the promotion status data may be detected in time, thereby effectively ensuring the reliability of evaluation of the promotion effect, and improving promoters' satisfaction.

It may be clearly understood by a person skilled in the art that, for the purpose of convenient and brief description, for detailed working processes of the foregoing system, apparatus, and unit, reference may be made to the corresponding processes in the foregoing method embodiments, and the details are not described herein again.

In the several embodiments provided in the present invention, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present invention. The foregoing storage medium includes any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that modifications can still be made to the technical solutions described in the foregoing embodiments or equivalent replacements can be made to some technical features, as long as such modifications or replacements do not cause the essence of corresponding technical solutions to depart from the spirit and scope of the technical solutions of the embodiments of the present invention.

What is claimed is:

1. A method for monitoring computer application promotion status data of a promotion account, the promotion account including at least two promotion layers that include a first promotion layer and a second promotion layer, there being a hierarchical structural relationship between the at least two promotion layers of the promotion account, the at least two layers of the promotion account comprising a combination of at least two of: an account layer; a promotion plan layer; a promotion unit layer; or a keyword/creative-idea layer, the first promotion layer being higher than the second promotion layer, the method comprising:

obtaining, using a processor, a specified time range close to a current time according to a current time, a promotion-status-data time delay and a monitoring frequency;

performing, using the processor, a plurality of processing steps including at least log output, log cutting, multi-level multi-path transmission, and log statistic on the computer application status data of the at least two promotion layers of the promotion account, wherein the computer application promotion status data comprises: a presentation index, a consumption index, or a quality score index;

sampling, using the processor, the processed computer application promotion status data of the at least two promotion layers of the promotion account within the specified time range;

determining, using the processor, according to the computer application promotion status data of the at least two promotion layers, the consistency between the computer application promotion status data of the first promotion layer and the computer application promotion status data of the second promotion layer, comprising:

in response to a sum of the computer application promotion status data of the first promotion layer being equal to a sum of the computer application promotion status data of the second promotion layer, determining that the computer application promotion status data of the first promotion layer is consistent with the computer application promotion status data of the second promotion layer;

in response to the sum of the computer application promotion status data of the first promotion layer being smaller than the sum of the computer application promotion status data of the second promotion layer, determining that the computer application promotion status data of the first promotion layer is not consistent with the computer application promotion status data of the second promotion layer; and in response to the sum of the computer application promotion status data of the first promotion layer being greater than the sum of the computer application promotion status data of the second promotion layer, determining that the computer application promotion status data of the second promotion layer is complete, determining that the computer application promotion status data of the first promotion layer is not consistent with the computer application promotion status data of the second promotion layer; and in response to the computer application promotion status data of the first promotion layer being not consistent with the computer promotion status data of the second promotion layer, obtaining, using the processor, an abnormal monitoring result of the promotion account and outputting, using the processor, the obtained abnormal result by generating an indicator, an SMS message or an email.

2. The method according to claim 1, wherein the computer application promotion status data further comprises:
a click index; or
a conversion index.

3. The method according to claim 1, wherein the method further comprises:
in response to the sum of the computer application promotion status data of the first promotion layer being greater than the sum of the computer application promotion status data of the second promotion layer, determining that the computer application promotion status data of the second promotion layer is not complete, determining that the computer application promotion status data of the first promotion layer is consistent with the computer application promotion status data of the second promotion layer.

4. The method according to claim 1, wherein the determining, according to the computer application promotion status data of the at least two promotion layers, the consistency between the computer application promotion status data of the first promotion layer and the computer application promotion status data of the second promotion layer comprises:

in response to computer application promotion status data of a first promotion node in the first promotion layer being equal to a sum of computer application promotion status data of at least one second promotion node that is in the second promotion layer and that corresponds to the first promotion node, determining that the computer application promotion status data of the first promotion layer is consistent with the computer application promotion status data of the second promotion layer;

in response to the computer application promotion status data of the first promotion node in the first promotion layer being smaller than the sum of the computer application promotion status data of the at least one second promotion node that is in the second promotion layer and that corresponds to the first promotion node, determining, according to whether the computer application promotion status data of the first promotion node is complete, whether the computer application promotion status data of the first promotion layer is consistent with the computer application promotion status data of the second promotion layer; and in response to the computer application promotion status data of the first promotion node in the first promotion layer being greater than the sum of the computer application promotion status data of the at least one second promotion node that is in the second promotion layer and that corresponds to the first promotion node, determining, according to whether the computer application promotion status data of the second promotion node is complete, whether the computer application promotion status data of the first promotion layer is consistent with the promotion status data of the second promotion layer.

5. The method according to claim 4, wherein determining, according to whether the computer application promotion status data of the first promotion node is complete, whether the computer application promotion status data of the first promotion layer is consistent with the computer application promotion status data of the second promotion layer comprises:

in response to the computer application promotion status data of the first promotion node being incomplete, determining that the computer application promotion status data of the first promotion layer is consistent with the computer application promotion status data of the second promotion layer; and in response to the computer application promotion status data of the first promotion node being complete, determining that the computer application promotion status data of the first promotion layer is not consistent with the computer application promotion status data of the second promotion layer;

determining, according to whether the computer application promotion status data of the second promotion node is complete, whether the computer application promotion status data of the first promotion layer is consistent with the computer application promotion status data of the second promotion layer comprises:

in response to the computer application promotion status data of the second promotion node being incomplete, determining that the computer application promotion status data of the first promotion layer is consistent with the computer application promotion status data of the second promotion layer; and in response to the computer application promotion status data of the second promotion node being complete, determining that the computer application promotion status data of the first promotion layer is not consistent with the computer application promotion status data of the second promotion layer.

6. The method according to claim 1, after sampling the processed computer application promotion status data of at least two promotion layers of the promotion account within the specified time range, the method further comprises:

determining, according to the computer application promotion status data of the at least two promotion layers, whether computer application promotion status data of each of the at least two promotion layers in a specified promotion dimension is consistent; and in response to the computer application promotion status data of each of the at least two promotion layers in the specified promotion dimension being not consistent, obtaining a suspicious monitoring result of the promotion account.

7. The method according to claim 6, wherein determining, according to the computer application promotion status data of the at least two promotion layers, whether computer application promotion status data of each promotion layer of the at least two promotion layers in a specified promotion dimension is consistent comprises:

for the each promotion layer of the at least two promotion layers:

in response to a sum of computer application promotion status data, in the specified promotion dimension, of promotion nodes in the each promotion layer being equal to computer application promotion status data of the promotion nodes in the each promotion layer, determining that the computer application promotion status data of the each promotion layer in the specified promotion dimension is consistent; and in response to the sum of computer application promotion status data, in the specified promotion dimension, of the promotion nodes in the each promotion layer being not equal to computer application promotion status data of the promotion nodes in the each promotion layer, determining that the computer application promotion status data of the each promotion layer in the specified promotion dimension is not consistent.

8. A device, comprising:
one or more processors;
a memory;
one or more programs, wherein the one or more programs are stored in the memory, and when the one or more programs are executed by the one or more processors, operations for monitoring computer application promotion status data of a promotion account are performed, the promotion account including at least two promotion layers that include a first promotion layer and a second promotion layer, there being a hierarchical structural relationship between the at least two promotion layers of the promotion account, the at least two layers of the promotion account comprising a combination of at least two of: an account layer; a promotion plan layer; a promotion unit layer; or a keyword/creative-idea layer, the first promotion layer being higher than the second promotion layer, wherein the operations comprise:

obtaining, using a processor, a specified time range close to a current time according to a current time, a promotion-status-data time delay and a monitoring frequency;

performing, using the processor, a plurality of processing steps including at least log output, log cutting, multi-level multi-path transmission, and log statistic on the computer application status data of the at least two promotion layers of the promotion account, wherein the computer application promotion status data comprises: a presentation index, a consumption index, or a quality score index;

sampling the processed computer application promotion status data of the at least two promotion layers of a promotion account within the specified time range;

determining, according to the computer application promotion status data of the at least two promotion layers, the consistency between the computer application promotion status data of the first promotion layer and the computer application promotion status data of the second promotion layer, comprising:

in response to a sum of the computer application promotion status data of the first promotion layer being equal to a sum of the computer application promotion status data of the second promotion layer, determining that the computer application promotion status data of the first promotion layer is consistent with the computer application promotion status data of the second promotion layer;

in response to the sum of the computer application promotion status data of the first promotion layer being smaller than the sum of the computer application promotion status data of the second promotion layer, determining that the computer application promotion status data of the first promotion layer is not consistent with the computer application promotion status data of the second promotion layer; and in response to the sum of the computer application promotion status data of the first promotion layer being greater than the sum of the computer application promotion status data of the second promotion layer, determining that the computer application promotion status data of the second promotion layer is complete, determining that the computer application promotion status data of the first promotion layer is not consistent with the computer application promotion status data of the second promotion layer; and in response to the computer application promotion status data of the first promotion layer being not consistent with the computer application promotion status data of the second promotion layer, obtaining an abnormal monitoring result of the promotion account and outputting the obtained abnormal result by generating an indicator, an SMS message or an email.

9. The device according to claim 8, wherein the computer application promotion status data further comprises:
a click index; or
a conversion index.

10. The device according to claim 8, wherein the operations further comprise:
in response to the sum of the computer application promotion status data of the first promotion layer being greater than the sum of the computer application promotion status data of the second promotion layer, determining that the computer application promotion status data of the second promotion layer is not complete, determining that the computer application promotion status data of the first promotion layer is consistent with the computer application promotion status data of the second promotion layer.

11. The device according to claim 8, wherein the operations further comprise:
in response to computer application promotion status data of a first promotion node in the first promotion layer being equal to a sum of computer application promotion status data of at least one second promotion node that is in the second promotion layer and that corresponds to the first promotion node, determining that the computer application promotion status data of the first promotion layer is consistent with the computer application promotion status data of the second promotion layer;
in response to the computer application promotion status data of the first promotion node in the first promotion layer being smaller than the sum of the computer application promotion status data of the at least one second promotion node that is in the second promotion layer and that corresponds to the first promotion node, determining, according to whether the computer application promotion status data of the first promotion node is complete, whether the computer application promotion status data of the first promotion layer is consistent with the computer application promotion status data of the second promotion layer; and
in response to the computer application promotion status data of the first promotion node in the first promotion layer being greater than the sum of the computer application promotion status data of the at least one second promotion node that is in the second promotion layer and that corresponds to the first promotion node, determining, according to whether the computer application promotion status data of the second promotion node is complete, whether the computer application promotion status data of the first promotion layer is consistent with the computer application promotion status data of the second promotion layer.

12. The device according to claim 11, wherein the operations further comprise:
in response to the computer application promotion status data of the first promotion node in the first promotion layer being smaller than the sum of the computer application promotion status data of the at least one second promotion node that is in the second promotion layer and that corresponds to the first promotion node, and the computer application promotion status data of the first promotion node is incomplete, determining that the computer application promotion status data of the first promotion layer is consistent with the computer application promotion status data of the second promotion layer;
in response to the computer application promotion status data of the first promotion node in the first promotion layer being smaller than the sum of the computer application promotion status data of the at least one second promotion node that is in the second promotion layer and that corresponds to the first promotion node, and the computer application promotion status data of the first promotion node is complete, determining that the computer application promotion status data of the first promotion layer is not consistent with the computer application promotion status data of the second promotion layer;
in response to the computer application promotion status data of the first promotion node in the first promotion layer being greater than the sum of the computer application promotion status data of the at least one second promotion node that is in the second promotion layer and that corresponds to the first promotion node, and the computer application promotion status data of the second promotion node is incomplete, determining that the computer application promotion status data of the first promotion layer is consistent with the computer application promotion status data of the second promotion layer; and
in response to the computer application promotion status data of the first promotion node in the first promotion layer being greater than the sum of the computer application promotion status data of the at least one second promotion node that is in the second promotion layer and that corresponds to the first promotion node, and the promotion status data of the second promotion node is complete, determining that the computer application promotion status data of the first promotion layer is not consistent with the computer application promotion status data of the second promotion layer.

13. The device according to claim 8, wherein the operations further comprise:
determining, according to the computer application promotion status data of the at least two promotion layers, whether computer application promotion status data of each of the at least two promotion layers in a specified promotion dimension is consistent; and
in response to the computer application promotion status data of each of the at least two promotion layers in the specified promotion dimension being not consistent, obtaining a suspicious monitoring result of the promotion account.

14. The device according to claim 13, wherein the operations further comprise:
for each promotion layer of the at least two promotion layers:
in response to a sum of computer application promotion status data, in the specified promotion dimension, of promotion nodes in the each promotion layer being equal to computer application promotion status data of the promotion nodes in the each promotion layer, determining that the computer application promotion status data of the each promotion layer in the specified promotion dimension is consistent; and
in response to the sum of computer application promotion status data, in the specified promotion dimension, of the promotion nodes in the each promotion layer being not equal to promotion status data of the promotion nodes in the each promotion layer, determining that the computer application promotion status data of the each promotion layer in the specified promotion dimension is not consistent.

15. A non-volatile computer storage medium, wherein the non-volatile computer storage medium stores one or more programs, and when the one or more programs are executed by a device, the device performs operations for monitoring computer application promotion status data of a promotion account, the promotion account including at least two promotion layers that include a first promotion layer and a second promotion layer, there being a hierarchical structural relationship between the at least two promotion layers of the promotion account, the at least two layers of the promotion account comprising a combination of at least two of: an account layer; a promotion plan layer; a promotion unit layer; or a keyword/creative-idea layer, the first promotion layer being higher than the second promotion layer, wherein the operations comprise:

obtaining, using a processor, a specified time range close to a current time according to a current time, a promotion-status-data time delay and a monitoring frequency;

performing, using the processor, a plurality of processing steps including at least log output, log cutting, multi-level multi-path transmission, and log statistic on the computer application status data of the at least two promotion layers of the promotion account, wherein the computer application promotion status data comprises: a presentation index, a consumption index, or a quality score index;

sampling the processed computer application promotion status data of the at least two promotion layers of a promotion account within the specified time range;

determining, according to the computer application promotion status data of the at least two promotion layers, the consistency between the computer application promotion status data of a first promotion layer and the computer application promotion status data of the second promotion layer, comprising:

in response to a sum of the computer application promotion status data of the first promotion layer being equal to a sum of the computer application promotion status data of the second promotion layer, determining that the computer application promotion status data of the first promotion layer is consistent with the computer application promotion status data of the second promotion layer;

in response to the sum of the computer application promotion status data of the first promotion layer being smaller than the sum of the computer application promotion status data of the second promotion layer, determining that the computer application promotion status data of the first promotion layer is not consistent with the computer application promotion status data of the second promotion layer; and in response to the sum of the computer application promotion status data of the first promotion layer being greater than the sum of the computer application promotion status data of the second promotion layer, determining that the computer application promotion status data of the second promotion layer is complete, determining that the computer application promotion status data of the first promotion layer is not consistent with the computer application promotion status data of the second promotion layer; and in response to the computer application promotion status data of the first promotion layer being not consistent with the computer application promotion status data of the second promotion layer, obtaining an abnormal monitoring result of the promotion account and outputting the obtained abnormal result by generating an indicator, an SMS message or an email.

\* \* \* \* \*